Figure 1:
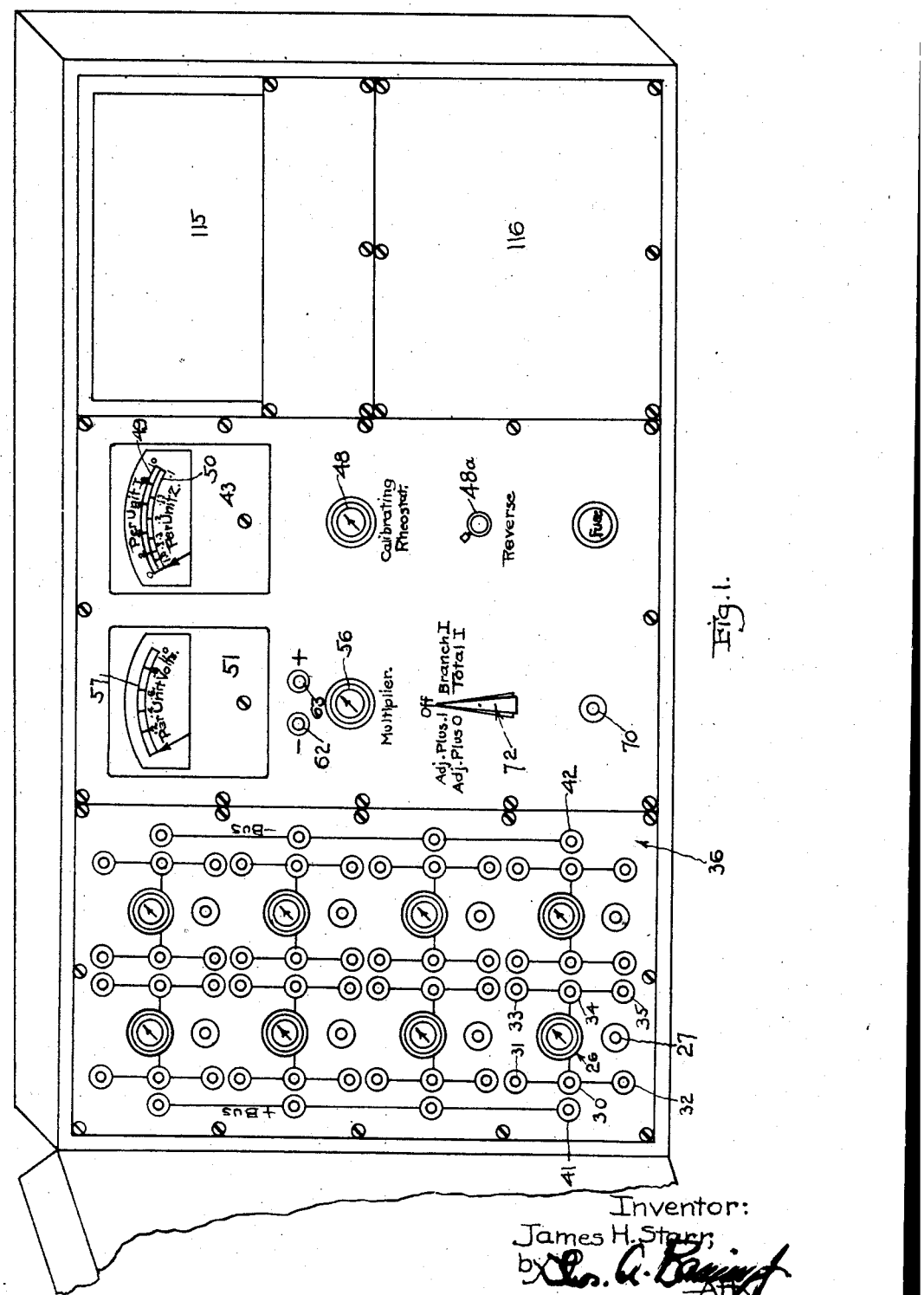

Nov. 10, 1942. J. H. STARR 2,301,470
CALCULATING TABLES AND THE LIKE
Filed Nov. 22, 1940 2 Sheets-Sheet 1

Inventor:
James H. Starr,
by
Atty.

Patented Nov. 10, 1942

2,301,470

UNITED STATES PATENT OFFICE 2,301,470

CALCULATING TABLE AND THE LIKE

James H. Starr, La Grange, Ill.

Application November 22, 1940, Serial No. 366,689

4 Claims. (Cl. 235—61)

This invention relates to improvements in apparatus intended especially for the predetermination of the performance of power supply and distribution systems, and for the analysis of the conditions existing or which will exist in such systems under various assumed operating conditions. The calculating table herein disclosed is of such a nature that a wide variety of power supply system operating conditions may be simulated thereon in miniature; and in order that certain features of the invention may be better understood, I shall first mention various power supply system problems to the solution of which an instrument embodying the present invention may be adapted.

In the design and operation of a power supply system under normal load conditions, an important problem is the variation of the delivered voltage as the load varies between anticipated minimum and maximum conditions or values. A further problem is the division of load between two or more sources which may be of different efficiencies and of different capacities; the control of such load division being important in the interest of maximum over-all economy. A still further problem encountered in power system operation is the predetermination of the maximum load which may be carried by the system under conditions of gradual load increment without synchronous equipment falling out of step. This load limit is known as the static stability limit. Another important problem frequently encountered is the predetermination of the magnitude and distribution of current throughout the system under the condition of accidental short circuit at any point, this information being essential in the selection and co-ordination of the protective equipment such as circuit breakers and relays. A still further problem is the predetermination of the ability of the synchronous equipment to remain in step during and after such short circuit conditions, the maximum load which such a system can carry during such circumstances being known as the transient stability limit.

Theoretically, all of the system operating problems to which the calculating table is adapted can be completely solved by the application of Kirchoff's laws, but except in extremely simple cases the work is very tedious and for a system of normal complexity becomes utterly impracticable. Voltage regulation problems can be solved by successive approximations although the work involved is very great. Short circuit analyses and stability problems can be solved by simplification of the system through successive star-delta and delta-star transformations. All of the methods of direct calculation discussed are laborious and usually all of the calculations must be repeated for each change of assumed operating conditions.

Calculating tables have been employed to materially reduce the time and labor involved in the solution of problems of the character here considered. These tables have in general consisted of a source of constant potential, a plurality of impedance elements connectable to simulate in miniature the system under consideration and adjustable to impedance values proportional to the impedance of the corresponding elements of the real system; together with an instrument or instruments connectable to permit observation of the current and voltage at any point in the simulated network, in miniature.

It is customary in the determination of short circuit conditions to ignore the resistance and capacitance of the various elements of the system and to represent the various impedances by their inductive reactance only. The calculating table for this purpose is normally operated on direct current and the inductive reactances are represented by resistances. For voltage regulation, load division, and stability studies, it is customary to represent the impedance of each element of the actual system in miniature, at least to the extent of including both the resistance and reactance component of each impedance element. In some cases distributed capacitance and mutual inductance are also represented. A calculating table for such application is normally operated from alternating current and each miniature element consists of an adjustable resistance and an adjustable inductive reactance.

In both types of calculating table as heretofore constructed, it has been the practice to employ resistance elements of definite ohmic value tapped at definite points together with a calibrated dial switch, or the equivalent, permitting the operator to select the desired resistance for inclusion in the miniature circuit by adjustment of the dial switch to the tap nearest the desired value. When inductive reactance elements are also included, a similar procedure has been adopted. As a result of this practice each circuit element of the calculating tables heretofore available has required that the manufacturer provide a multiplicity of resistance values, each one accurate within close limits, and further, where inductive reactance is included, a similar multiplicity of accurately adjusted tap points on each reactor element must be provided. Further, it has been impossible to adjust either the resistance or the reactance to values between the tapped points provided.

According to my invention, I have provided resistance elements which are continuously variable between predetermined limits, such as a resistance rheostat having a movable arm slidably in contact with a resistance wire. Similarly, in reactance elements, my invention provides for continuously variable adjustment between predetermined limits as by the use of a movable magnetic core in a solenoid winding which may be adjusted to vary the inductance of the winding in manner well known in this art, or other arts.

When a current of arbitrarily selected value, I, defined as "base current" passes through an impedance of magnitude "Z," there appears across the terminals of that impedance a potential difference "e," measured in volts. If the voltage of the system be designated as "E," the per unit value of the impedance in question is $e/E = ZI/E$. Similarly, the per cent impedance is defined as $(e/E) \times 100\% = (ZI/E) \times 100\%$.

My invention provides a current responsive instrument directly calibrated in percent impedance or per unit impedance, together with switching facilities whereby the instrument may be connected in series circuit with the resistance portion or the reactance portion of any element of my calculating table, and the series circuit so formed is connected to a source of potential. Adjustment of the resistance or reactance thus connected in series with the instrument causes the instrument to read directly on the proper scale the percent or per unit value to which that portion of the element has been adjusted.

According to my invention I have thus eliminated the very substantial cost incident to provision of a plurality of circuit elements each of which includes one or more dial switches all points of which have been calibrated at the time of manufacture to definite ohmic values. I have substituted continuously variable impedances, together with instrument and switching facilities whereby each may be adjusted to any value within its range by direct comparison with the instrument. In addition to the substantial reduction in cost inherent in this arrangement, my invention provides continuous stepless adjustment; and as a consequence of the use of per unit or percent values, my invention instrument may be operated from any convenient power source of any voltage withiln reasonable limits, provided only that the voltage remain substantially constant during the solution of any one problem. This makes it possible for me to provide a calculating table operable from dry cells or the like, where only system reactance is represented, or from any convenient alternating current outlet of proper frequency, in the case of a calculating table embodying my present invention and intended to represent both reactance and resistance components of each impedance unit. The voltage available from dry cells may be expected to decrease 20 to 25% with age, and the voltage of a nominal 115 volt outlet may be expected to have any value between approximately 110 and 130 volts, depending on the location and the practice of the utility supplying that area. Such variations in voltage do not affect the accuracy of tests made by instruments embodying the features of my present invention, provided only that the voltage regulation during the solution of a particular problem is held within narrow limits.

One object of my present invention is to make provision for use of a single current responsive instrument in adjusting all the impedance elements to their desired and correct values to correctly simulate the corresponding elements of the real system; and to make provision for subsequently using the same instrument to determine the magnitude of the current in each such simulating unit under the assumed conditions under which the test is made. This involves the use of said instrument for tests under a very wide range of conditions and readings; and since the current flowing through this instrument is inversely proportional to the magnitude of the resistance of the simulating unit being tested, it follows that an instrument suitable for setting up very small values of resistance would have to be capable of high current readings; and furthermore, correspondingly large sources of current supply would have to be available for the operations, such as could not be conveniently provided by a dry battery or the like of reasonable size. In other words, the adjustment of a particular impedance element to represent a very low impedance, such for example as may be encountered in representing a short, large capacity transmission line, would normally be accompanied by a very large deflection of the instrument in question. To avoid complications in the design of this instrument, and to limit the current drain from the source of potential of low value, my invention also includes specific provision for the insertion, at will, of a predetermined per unit impedance in series with the impedance undergoing adjustment. When this constant impedance is in series circuit with the impedance being adjusted, the instrument reads the sum of the two impedances. It is thus possible to adjust an impedance element to a value of, say, 0.01 per unit, by connecting it in series with a permanent impedance element pre-adjusted to a value of 0.10 per unit under which condition the instrument will read 0.11 per unit when the desired adjustment has been completed. This is given by way of illustration only, of an application of this feature of my invention.

A feature of my present invention is the provision of an arrangement such as to minimize the possibility of damage to the impedance elements and to the instrument due to inadvertent errors of operation. This protection is afforded by the provision of arrangements whereby the previously mentioned permanent impedance element is used as a current limiting element. To this end I have provided means whereby the switching function in the operation of instruments embodying my invention may be accomplished in two steps, the first of which inserts the permanent impedance element into series connection with the remainder of the circuit, thereby limiting the maximum possible current to a value within the range of the instrument, and also indicating to the operator whether or not he may safely remove the permanent impedance element from the circuit by short-circuiting, so as to then read directly an impedance value of a particular condition.

A further object of my invention is to provide a calculating table in which all adjustments and observations may be made in per unit or percent impedance, and by use of percent current in place of actual ohmic and ampere values.

A further object of my present invention is to employ continuously variable impedance elements with provision for adjustment of each to any specific value within its range, by direct observation of the scale of an instrument, as distinguished from previous arrangements employing tapped impedance elements previously calibrated at the time of manufacture to specific values. In this connection it is a further object to make provision for use of the same instrument for the foregoing functions, and for subsequent functions in connection with observation of results after the elements of the table have been set up and connected together in proper manner.

A further object of my present invention is the provision of circuit switching and impedance facilities to permit all normal calculating operations to be carried out without exceeding a previously selected maximum current drain from the available source of current.

A still further object of my present invention is to provide a calculating table which may be readily carried about, or is portable; this result being made possible, among other things, by providing an arrangement such that it may be successfully operated from dry cells, or from convenient current outlets, and without introducing serious errors due to possible variations in available voltage, provided only that the voltage available remain substantially constant during the solution of any one problem.

A further object of my present invention is to provide a calculating table in which the various component parts are protected by fuses against inadvertent operating errors, and in which provision is made for minimizing such operating errors, so as to conserve fuses.

A further feature of my present invention is the provision of an arrangement whereby voltages between any selected portions or elements of the network may be directly measured in per unit values by the use of an indicating voltmeter, and without passing sufficient current through this voltmeter to measurably disturb the current distribution in the network, and thereby introduce errors.

A further object of my present invention is to assemble and mount the various parts of the complete device in such manner as to bring them into small compass, well related to each other for convenient manipulation during the various operations to be conducted; and in this connection to also provide a conveniently portable instrument, and one which may be folded up into small compass for such purpose.

Other objects and uses of the invention will appear from a detailed description of the same, which consists in the features of construction and combinations of parts hereinafter described and claimed.

Figure 2:
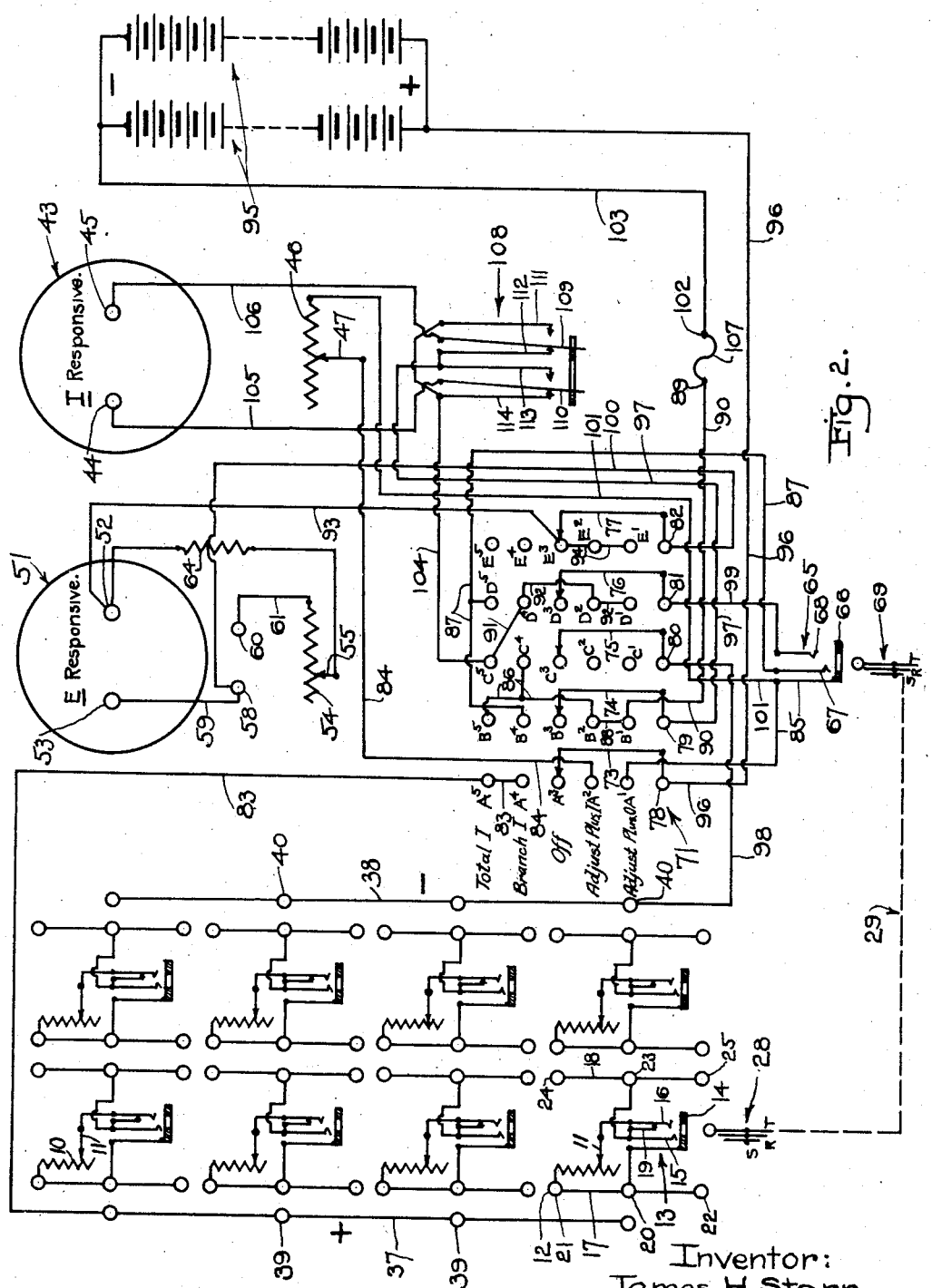

In the drawings:

Figure 1 shows a face view of the panel board of a calculating table embodying the features of my present invention, and with provision for eight simulating elements or units thereon, and it also shows the end portion of an adjacent panel board hinged to the main panel board, such adjacent board carrying additional simulating units to increase the capacity of the entire arrangement, and its flexibility and possibility to solve more complex problems; all said parts being shown in slight perspective; and Figure 2 shows a wiring diagram of the main panel board of Figure 1, the elements shown diagrammatically in Figure 2 being located in substantially the same relative locations as in Figure 1 so as to facilitate understanding and comparison between the two figures.

Referring now to the drawings, I have therein shown, merely by way of illustration, one embodiment of the features of my present invention, and it will be understood that in so illustrating my invention I do so merely by way of illustration, and not as any limitation of the scope of my invention, except as I may limit myself in the claims to follow. Furthermore, I have chosen to illustrate schematically and more or less diagrammatically a calculating table having provision for simulation of only a few of the elements of a real power supply and distribution system; (for example, eight), but it will be understood that the provision for simulation of either a greater or a lesser number of such elements is merely a matter of repetition of parts, within the scheme of my invention.

I provide a "simulating unit" corresponding to each of the real elements of the power supply and distribution system in question; or, in order to provide for general use of my calculating table for solution of many of the intricate problems presented in actual service, I provide a sufficient number of these "simulating units" to correspond to the number of real elements of the power supply and distribution system which probably ever will appear in any given problem. Each of these simulating units includes a continuously variable resistance element which may be variable between zero and its full value to simulate proportionately the value of the impedance of the real circuit element; together with suitable jack means to accommodate a corresponding cord plug, so that such simulating element may be readily connected to the test meter. I also provide suitable connectors in connection with each of these simulating units to facilitate ready connection thereof to other adjacent like units in setting up the artificial system to simulate the real system being studied.

In connection with the foregoing I also provide a current responsive test meter which may be used either to read the current flowing through any selected simulating unit, or through the system as a whole, under test conditions; and this meter is also usable during the preliminary operations of setting the several simulating units to proper settings to correctly simulate the several elements of the system being simulated and analyzed. To facilitate all these operations, and for other purposes I also provide a master control switch having several positions and suitable contacts, whereby this switch may be moved to various positions to enable quick and ready completion of the connections needed to make the preliminary adjustments of the several simulating units, and to other positions to enable ready test of currents flowing through the entire system under various conditions, or through any selected portion or unit of the system after the entire system has been set up in miniature.

I also provide a voltmeter for making possible the reading of voltage existing across selected points of the miniature system under selected conditions of test, together with suitable connectors for connecting this voltmeter to the proper points of the system.

In connection with the first mentioned or current responsive meter I also provide a calibrating rheostat whereby this meter may be used for setting or adjustment of the several simulating unit resistances correctly, when said resistances are to be of relatively small amount, and without the need of using a meter built to handle currents of more than a desired value or amount. This calibrating rheostat may be set or adjusted to ensure addition of a selected amount or percentage to the real amount of the resistance of the simulating unit, and under the voltage of the current supply existing during the carrying out of the tests in question. In connection with the voltmeter I also provide a "multiplying rheostat" or "multiplier" which may be so set during any given series of test operations that said voltmeter will correctly read the "per unit" voltage, under the voltage of the current supply existing during the carrying out of the tests in question. By these arrangements I am enabled to carry forward a series of tests and readings and secure correct results therefrom, without having to make use of an accurately predetermined voltage of the supply of current being used, and merely on the assumption that the voltage of such supply shall remain substantially constant during such series of tests.

In connection with the testing of current flow through simulating units or other portions of the miniature system, it will sometimes happen that the direction of such flow will be reversed due to conditions of load or otherwise created at other locations in the system; and in order to meet such conditions, and still ensure correct readings of the the test meter, I have provided a reversing switch whereby the current through the meter may be cause to flow in the proper direction for readings on said instrument, without having to provide an instrument which will read to both sides of a zero position.

Other features will presently appear from a detailed description of the device.

Each of the "simulating units" includes a rheostat including the continuous resistance element 10, and the sliding contact 11 which may be continuously slid to any contact position along said resistance between zero and the full or maximum value of the resistance. In other words, said rheostat is continuously variable through a range from zero value to its maximum value, so that it may be set to simulate any amount of impedance from zero to the maximum simulated amount. It will be noted, however, that I do not need to make provision for reading the momentary value of the resistance, at the position of the simulating unit, corresponding to any given setting of the contact 11, or corresponding to each and every possible setting of said contact, since I have made other provision therefor, as hereinelsewhere set out. Due to this circumstance I am able to use very simple rheostat constructions, and it is not necessary to accurately calibrate each of these many rheostats to exact values, nor to maintain them to such accurate calibrations, in order to secure exact and reliable test results in the operation of the miniature system. As will presently appear herein, I provide means to adjust or set each rheostat to the correct value for the test in question, by use of the test meter, which is temporarily connected to such rheostat during the setting of the rheostat, so that when the entire table has been set up all of the many rheostats have been adjusted by use of a single instrument, and therefore to a common standard of comparison.

Furthermore, I may use, as a preferred embodiment of my invention, rheostats including resistance elements 10, of such a form or nature that for given changes of position of the contact 11, there occur progressively larger or smaller changes of amount of the resistance. For example, by this arrangement equal increments of movement of the contact 11, commencing at the zero end of the resistance 10, might cause progressively larger or progressively smaller increments of change of the total resistance between the terminal 12 of the resistance, and the contact 11, the total amount of the resistance element 10 being of course of fixed value. Such a form of rheostat resistance, with progressively larger increments of change of resistance for equal movements of the contact 11, is generally desirable for use in this connection, for the reason that thereby it is possible to secure as great accuracy of adjustment of the resistance of the simulating unit for small values thereof, as for larger values thereof, and without the need of using great accuracy in the setting of the contact 11 when setting the rheostat for relatively small values.

Each simulating unit also includes means whereby the resistance element thereof may be conveniently connected to other portions of the miniature system, so as to incorporate said simulating unit into the complete miniature system; and also includes means whereby the impedance of such simulating unit may be connected to the test meter, in order to test the current flowing through such unit during the preliminary setting, or during the conduct of a test or tests after the table has been completely or partially set up. For this purpose I provide a simple form of jack 13 for each simulating unit, each such jack including a sleeve 14, connected to one end of the resistance 12, a ring (shown by the contact 15), and a tip 16, said tip being connected to the movable contact 11 of the resistance element. Each simulating unit also conveniently includes a short bus bar 17, connected to the resistance element end 12, and also another short bus bar 18 connected to the ring contact 15. There is also provided a spring contact 19, connected to the ring contact 15 and to the bus bar 18; and such spring contact 19 is normally in contact with the tip 16 as shown in Figure 2. Preferably, also, each bus bar 17 has the central tip jack 20, and the two end tip jacks 21 and 22; and the bus bar 18 has the central tip jack 23, and the two end contacts 24 and 25.

Reference to Figure 1, which is a face view of a convenient practical embodiment of my invention, shows a rheostat handle or knob or finger piece 26 whereby the resistance contact 11 is moved over the resistance element 10, the jack opening 27 for permitting insertion of the plug 28 of a suitable cord 29 (see Figure 2), and the sleeves 30, 31, 32, 33, 34 and 35 which are or correspond to the tip jacks 20, 21, 22, 23, 24 and 25, respectively. All these parts are conveniently mounted or carried by the panel board 36 of the calculating table.

The foregoing parts are provided for each simulating unit, and in the drawings I have shown only eight such units, as a matter of convenience and simplification in illustration, but it will be understood that any number of such units, either greater or less than those illustrated may be used, and may be provided, according to the complexity and nature of the problems to be analyzed and solved.

The panel board 36 also includes, preferably adjacent to its ends, the panel bus bars 37 and 38, which I have shown as positive and negative, respectively; and these buses are provided with the tip jacks 39 (on the bus bar 37) and 40 (on the bus bar 38), and the panel board has the sleeves 41 and 42, which are or correspond to these tip jacks 39 and 40, respectively, so that suitable cord tips may be set through these openings and into the tip jacks to establish connection with the respective bus bars.

It may be noted that the openings 41 are adjacent to the corresponding openings 30 of the respective simulating units; and that the openings 42 are adjacent to the corresponding openings 34 of the simulating units; and also that the opening 34 of each simulating unit is adjacent to the opening 30 of the right hand adjoining simulating unit; also that the openings 31 and 33 of each simulating unit are adjacent to the openings 32 and 35 of the adjoining higher unit. All these adjacent openings are located at the same spacing from each other so that connections may be established between the corresponding sleeves by means of small, short U-shaped connectors or staples, which may be readily inserted into or removed from the panel board from in front thereof. Such simple connectors may therefore be used in setting up portions of the net-work simulating circuit on the table, and changes may be easily made in such connections from time to time, as needed.

At a convenient location, preferably on the panel board 36, there is mounted a test meter 43, having the terminals 44 and 45. Corresponding thereto there is provided a "calibrating rheostat" 46; and the movable contact 47 of this calibrating rheostat is adjustable from in front of the panel board by means of the handle or knob or finger piece 48. The dial or face of this meter carries two sets of scales 49 and 50, one designated "per unit I" or similar marking, and the other designated "per unit Z" or similar marking. At another convenient location, preferably on the panel board 36, there is mounted a voltmeter 51, having the terminals 52 and 53. Corresponding thereto there is provided a "multiplier" 54 in the form of a rheostat; and the movable contact 55 of this multiplier is adjustable from in front of the panel board by means of the handle or knob or finger piece 56. The dial or face of this voltmeter carries the scale 57 designated "per unit volts" or similar marking. The terminal 53 of this voltmeter is connected to a tip jack 58 by the line 59; and the end of the multiplier rheostat 54 is connected to another tip jack 60 by the line 61; and the panel board carries these jacks or is provided with suitable openings 62 and 63 in line with these jacks so that suitable tips may be inserted through the panel board and into connection with these jacks. Preferably the resistance 64 is permanently inserted into the line 55, as shown.

At a convenient location on the panel board there is provided a jack 65, having the sleeve 66, ring 67 and tip 68; so that the plug 69 of the cord 29 already referred to may be inserted into this jack to thereby carry the cord connections to these contacts. Since the plug 28 on the other end of this cord may be plugged into the jack of any selected simulation unit it is seen that upon doing this the contacts 16 and 19 of such simulating unit will be separated from each other, and at the same time the resistance of the simulating unit will be connected to the tip and sleeve contacts of the cord. Then, when the plug 69 on the other end of the cord is inserted into jack 65 its tip ring and sleeve contacts will be placed in connection with the tip 68, ring 67 and sleeve 66 of the jack 65. In other words, the resistance of the simulating unit is normally connected to the bus bars 17 and 18 of such unit, but upon insertion of the plugs 28 and 69 of the cord 29 into the jack of the simulating unit and the jack 65, respectively, the resistance of the simulating unit is connected between bus bars 17 and 18 through the cord 29 and any element which may be connected to the tip and ring of the jack 65, and simultaneously the resistance 10 is bridged by any element which may be connected to tip and sleeve of jack 65. The jack opening 70 in the panel board permits insertion of the plug 69 into the jack 65 as aforesaid.

I have provided a "control switch" designated in its entirety by the numeral 71. This control switch is conveniently mounted on the panel board; and it includes a rock shaft which can be turned back and forth by the handle or finger piece 72 into either of five positions designated as "Adjust plus 0," "Adjust plus .1," "Off," "Branch I," and "Total I," as shown in Figure 1 on the face of the panel board. It may be noted here that the "zero" position is preferably located in the central switch position, and that in order to reach the "Adjust plus 0" position the operator must pass through the "Adjust plus .1" position, and may stop at the last mentioned position before reaching the "Adjust plus 0" position in order to assure certain protection, as hereinafter explained.

This switch carries five movable contacts 73, 74, 75, 76 and 77 as shown in Figure 2, and the arrangement is such that these contacts are permanently connected to the switch terminals 78, 79, 80, 81 and 82, as shown. Corresponding to each of these movable contacts 73, 74, 75, 76 and 77 there are five stationary contacts corresponding to the five switch positions heretofore mentioned, so that as the switch handle or finger piece 72 is moved back and forth the desired connections are established as presently to be explained. These five sets of stationary contacts are herein conveniently designated as "A," "B," "C," "D" and "E" sets, and it will be understood that as the switch is moved back and forth its movable contact 73 successively engages the various "A" contacts, that the movable contact 74 successively engages the various "B" contacts, that the movable contact 75 successively engages the "C" contacts, that the movable contact 76 successively engages the "D" contacts, and that the movable contact 77 successively engages the "E" contacts. Commencing with the extreme left-hand or counterclockwise position of the finger piece or knob 72, I shall designate these stationary contacts as $A^1$, $A^2$, $A^3$, $A^4$, and $A^5$, respectively; as $B^1$, $B^2$, $B^3$, $B^4$, and $B^5$, respectively; as $C^1$, $C^2$, $C^3$, $C^4$, and $C^5$, respectively; as $D^1$, $D^2$, $D^3$, $D^4$, and $D^5$, respectively; and as $E^1$, $E^2$, $E^3$, $E^4$, and $E^5$, respectively.

In order to secure the desired interchanges of connections during the operations of the instrument to be hereinafter explained, the following connections have been shown, namely; bus bar 37 is connected to $A^4$ and $A^5$ by means of the line 83; calibrating rheostat contact 47 is connected to $A^2$ by means of the line 84; sleeve 66 of the jack 65 is connected to $A^1$ by means of the line 85; $B^2$ and $B^5$ are connected to $C^4$ by means of the line 86; $B^4$ is connected to $D^5$ and to the ring 67 of jack 65 by means of the line 87; $B^3$ and $B^1$ are connected together by means of the line 88; $B^1$ is connected to the fuse terminal 89 by means of the line 90; $C^5$ and $D^4$ are connected together by means of the line 91; $D^4$, $D^2$ and $D^1$ are connected together by means of the line 92; $E^3$, is connected to the voltmeter terminal 52 by means of the line 93; $E^3$, $E^2$, and $E^1$ are connected together by means of the line 94. Also, terminal 78 is connected to plus side of battery 95 by means of line 96; terminal 79 is connected to terminal 44 or 45 of test meter (through reversing switch) by means of line 97; terminal 80 is connected to bus bar 38 by means of line 98; terminal 81 is connected to tip 68 of jack 65 by means of line 99; and terminal 82 is connected to voltmeter terminal 53 (and tip jack 58) by means of line 100.

Also, line 85 is connected to the end of the calibrating rheostat 46 by means of the line 101; fuse terminal 102 is connected to negative side of battery 95 by means of line 103; $C^3$ is connected to reversing switch by means of the line 104; and the two terminals of the reversing switch are connected to the meter terminals 44 and 45 by means of the lines 105 and 106.

The renewable fuse link is shown at 107, and the reversing switch is designated in its entirety by the numeral 108. This reversing switch includes the two movable contacts 109 and 110, which are movable back and forth between the contacts 111—112 and 113—114, respectively, the lines 105 and 106 being connected, respectively, to the switch movable contacts 110 and 109 as shown. Conveniently, the reversing contacts 109 and 110 are shifted by the finger piece 48ª to the position opposite to that shown in Figure 2 by turning the finger piece 48ª, said contacts 109 and 110 normally standing in the position shown in Figure 2.

The finger piece or knob 26 of each simulating unit rheostat is preferably so arranged and connected to the contact 11 of such rheostat that clockwise movements of said knob are accompanied by needle deflections of the meter 51 towards the right; and conversely, counterclockwise movements of said knob are accompanied by movements of said instrument needle towards the left.

The following operations will now be readily understood;

Due to the fact that during the course of various of the operations to be performed at some subsequent stage of the procedure it may be found desirable to use the test meter for indications with simulating units which are of smaller impedance than the lowest "per unit Z" value shown on the scale of said instrument (being the right hand or high "per unit I" end of said scale), it will first be of advantage to calibrate said rheostat by use of the "calibrating meter," and in so doing to also secure a calibration such that correct operations are secured irrespective of the exact voltage delivered by the battery or other source of potential, provided, only, that such voltage does not materially vary during the course of the operations of the set of tests to be performed. To effect such calibration of the rheostat we first plug the cord 29 into both the jack 69 and the jack 28 of any selected simulation unit. The calibrating rheostat knob or finger piece 48 should then be turned over to its extreme counterclockwise position, to thereby insert the full resistance of said rheostat into circuit. The knob or finger piece 26 of the simulating unit should then be turned over to the extreme counterclockwise position to cut in all the resistance 10 into the circuit. By commencing the operation in this manner there is assurance that upon cutting out the calibrating resistance 46 in a subsequent operation the current flow will be limited, so that unnecessary fuse mortality will be eliminated.

The master control switch may now be moved to the "Adjust plus 0" position, thereby cutting out the calibrating resistance 46, but the current flow will still be limited by the presence of the full resistance 10 of the simulating unit in the circuit. The knob or handle 26 of the simulating unit in question may now be turned in a clockwise direction to gradually cut out the resistance 10 thereof, until the ammeter reads a selected amount on the lower scale thereof, for example, .2 per unit Z. The significance of this operation is that we have now set the value of the resistance 10 of the simulating unit to a position where it will represent 0.2 per unit Z under the conditions of voltage of supply (represented by the battery 95) available during the test; and it may be assumed that said voltage will not vary appreciably during the subsequent series of operations to be conducted to complete the entire test.

The master control switch may now be turned to the position "Adjust plus .1," thereby cutting in the resistance 46 and thereby lowering the current value with consequent lowering of reading of the meter (that is, movement of its needle towards the left on the scale 50); but it still remains to adjust the value of the resistance 46 of the calibrating rheostat to the proper amount corresponding to the 0.1 to be added to the reading. We therefore turn the knob or handle 48 clockwise (it was previously set to the full counterclockwise or left hand position), until the reading on the "Per unit Z" scale of the instrument 43 is the value of its previous reading (0.2) plus 0.1, namely, 0.3. We then know that the calibrating rheostat 46 has been set to the proper position (under the conditions of voltage supply existing), to ensure that whenever the control switch is moved to the position "Adjust plus .1," such 0.1 will be added to the simulated impedance, and that we shall be able, during subsequent operations, to set any of the individual simulating units to properly represent values less than the amount of 0.1, which is the extreme right hand or highest current reading of the ammeter. For example, if it should be desired to adjust any selected simulating unit to represent 0.04 (a reading less than 0.1), we may move the control switch to the position "Adjust plus 0.1," the proper simulating unit having been plugged in, then turn the knob or handle 26 of such simulating unit until the instrument 43 reads 0.14 on the scale 50, whereupon we shall know that said simulating unit has been adjusted to represent such low value of 0.04 correctly, and by the use of a meter having the limited scale disclosed herein.

The correctness of the setting of the calibrating rheostat as previously explained may be checked at any time. This may be done by merely turning the knob or handle 26 of the simulating unit which happens to be plugged in at the instant, so as to show any selected reading on the scale "Per unit Z" of the meter; then the reading on said scale should always be 0.1 higher when the control switch is in the "Adjust plus .1" position than when the control switch is in the "Adjust plus zero" position.

The foregoing preliminary adjustments or settings have to do with the setting of the calibration rheostat to the correct position. The voltmeter is now to be so adjusted that it will correctly read the per unit voltage. For this purpose the "Multiplier" rheostat 54 must be correctly adjusted. To do this the tip jack or socket 60 (for negative) is connected to the negative bus bar 38 by a suitable cord (with plugs), and the tip jack or socket 58 (for positive) is connected to the positive bus bar 37 by a suitable cord (with plugs). The master control switch is then moved to the position "Total I." This will place the voltmeter directly across the positive and negative buses, so that the voltmeter will be subjected, through the multiplier, to the full available voltage existing during the tests to be conducted. Then the knob or handle 56 of the multiplier rheostat may be turned to bring the voltmeter reading to the reading "1.0" on the scale 57, whereupon the voltmeter will correctly read in "Per unit E" during subsequent operations.

The foregoing preliminary adjustments having been made we are prepared to set up a group of simulating units to correctly represent impedances corresponding to units of the real distribution system, and also to connect these simulating units together in the correct manner corresponding to the real system in question. For this purpose the following procedure may be followed:

We first set or adjust each simulating unit to correctly represent the corresponding real element, whose value is, of course known in advance. To do this we plug in the cord into the jack opening 70 of the panel board, and into the jack opening 27 (on the panel board) corresponding to the simulating unit in question. As a precaution we then turn the knob or handle 26 of said simulating unit to the extreme left hand or counterclockwise position to thereby cut in the full value of the resistance 10 of the simulating unit, and thereby avoid excessive current flow. We then turn the master control switch to the position "Adjust plus zero" (it being assumed that the value to be set on the simulating unit is not less than 0.1); and then we adjust the knob or handle 26 of said simulating unit by turning clockwise or to the right, until the scale "Per unit Z" on the meter (scale 50) reads the value which has been assigned to this simulating unit directly. This adjustment is then complete.

If, perchance, the value to be set in the adjustment of the simulating unit is less than 0.1 (for example, 0.04), the following procedure is followed: Having inserted the cord plugs properly as already explained, move the master control switch to the position "Adjust plus .1," and then adjust the knob or handle 26 of the simulating unit until the meter reading is the desired amount for the simulating unit, plus 0.1, namely, in the example suggested, 0.14. It will then be known that said simulating unit actually represents the amount of 0.04.

It may be here mentioned that it is desirable, as a precautionary measure, to always set the master control switch to the position "Adjust plus .1" before it is moved to the position "Adjust plus zero," as such procedure will ensure that the current flow will not exceed the full scale reading of the meter, even though the rheostat contact 11 of the simulating unit in question be inadvertently moved to the full counterclockwise or left hand position, thereby cutting out the resistance 10 of said unit completely. This is true because with the master control switch in the "Adjust plus .1" position there is always the resistance of the calibrating rheostat in circuit. The master control switch may then be moved to the position "Adjust plus zero" to carry out the necessary setting when ready. By following this procedure the fuse mortality will be greatly reduced.

Each of the simulating units should be set to the proper value or position in the manner just above explained. It then remains to connect these units together and with respect to each other in the proper manner to simulate the network or system in question. To do this, the following procedure may be followed:

The two terminals or poles of each simulating unit are connected to the bus bars 17 and 18 of such unit. Therefore by the simple expedient of inserting U-shaped or staple connectors into the tip jacks or sockets 20, 21, 22, 23, 24 or 25 of the adjacent units we are able to connect these units successively together, when the adjacent units are to be connected together. When it is desired to effect connections between units which are not directly adjacent to each other on the panel board, such connections may be effected by use of suitable simple cords and cord tips inserted into the proper ones of the tip jacks 20, 21, 22, 23, 24 and 25 of the proper units. This will be readily understood by one skilled in the art. Manifestly, the number of possible combinations and network schemes and values which may be simulated in miniature by this arrangement is tremendous, especially in the case of a panel board having, say forty such units, since these units may be connected and interconnected in manifold arrangements. This result is further greatly facilitated by the provision of the bus bars 17 and 18, having the sockets thereof so located as to make possible, not only directly adjoining connections to adjacent units, but also making it possible to at the same time effect other connections to more remotely located units by the use of jumpers or cords.

In connection with the foregoing it will also be seen that many complex network arrangements may be very readily set up on such a panel board as that herein disclosed. For example, in the case of a network supplied by power sources at both ends, or at various locations, the main positive and negative bus bars 38 and 83 may be connected to the suitable simulating units at the proper locations, and these units in turn may then be interconnected in the proper manner, so that the power is fed into the system from the several locations in correct miniature simulation. It is not deemed necessary to enlarge on this flexibility in detail as the advantages and possibilities thereof will be readily apparent to one skilled in this art.

Many different kinds and details of tests may be conducted on the simulated network as hereinbefore disclosed. These tests may be for the purpose of ascertaining the current which will flow in various branches or locations under various conditions of short-circuiting or other loading; the total currents which will flow through the system under various conditions; the directions of such current or power flow under various conditions; and at various locations; the voltage existing across various portions of the system under various conditions of loading or short-circuiting; and many other results may be ascertained. Only a few of these need be here mentioned or explained, as any one skilled in this art will see or determine many other possible uses of the device.

In the case of a fault, for example, such fault may be applied by simply connecting the point of the fault to the negative bus bar 38 by a simple cord. After the application of this fault, the total current flowing through the system may be observed directly on the scale 49 of the meter 43 by turning the master control switch to the position "Total I." The result will then be observed in a direct reading of this instrument. Since this scale is marked to read "Per unit I," the result may be ascertained in "Times base amperes," or in "Times base KVA," proper factors being applied to the reading actually shown on the face of the scale. Likewise, since insertion of the three line cord plugs into the jacks through the opening 70 and the proper opening 27 of the panel board make it possible to open up the circuit at any selected simulating unit, the current flowing through that unit may be delivered to the instrument 43 and may then be read thereon by moving the master control switch to the position "Branch I." Thus the current flow at any selected location may be very quickly ascertained in a direct reading, and without having to disconnect or open up the system at any point other than to insert the instrument 43 in series relation at the location where such reading is to be effected.

If, as may occasionally happen, the total fault current is greater in magnitude than ten times the base, it cannot be read directly on the scale 49 because the reading would be beyond the end of said scale. In this event a correct result may be obtained by the following procedure: Select any convenient idle simulating unit, that is, one which has not been connected into the miniature system set up, and adjust it to 0.1 per unit resistance in the manner already explained. Then, by cords, insert this unit and resistance into the system between the point of fault and the negative bus bar 38. Then move the master control switch to the position "Total I" and observe the indication on the scale 50 (the per unit Z scale). The value thus obtained is the apparent impedance of the entire system as viewed from the point of fault and with the inclusion of the 0.1 impedance value which was so deliberately inserted into the system. Next subtract from the observed value of the impedance as viewed from the point of fault, the impedance 0.1 per unit, thus deliberately inserted, and take the reciprocal of the difference obtained. This reciprocal will be the true value of the fault current at this point in "Times base amperes."

To obtain the branch fault current under the condition that the total fault current exceeds ten times the base the following procedure may be followed: After observing the total fault current in the manner just described, move the master control switch to the "Total I" position and adjust the rheostat which has been inserted between the point of fault and the negative bus, until the instrument 43 reads just full scale or ten times base amperes. Then plug into the opening 27 of any branch or simulating unit in which the fault current is to be ascertained. Then move the master control switch to the position "Branch I" and read the fault current on the scale 49 of the meter. Then multiply the reading just observed by the total fault current as previously determined, and divide by ten. The result will be the true branch fault current on the branch in question.

The following comments are in order in respect to ascertaining voltage readings under such conditions as just above explained: Manifestly, when a resistance having a value of 0.1 Z per unit is inserted between the point of fault and the negative bus bar, the total net system voltage is less than the total voltage between bus bars. The most convenient method of determining voltage at various locations under these circumstances is as follows: Connect the voltmeter from the positive bus bar to the point of fault; then move the master control switch to the "Total I" position; then adjust the multiplier rheostat 54 until the voltmeter reads 0.50; then, leaving the negative voltmeter lead at the point of fault, place the positive voltmeter lead in any point in question and note the voltage reading while the master control switch is in the "Total I" position. Multiply the reading as just above obtained by two, and we have the true voltage at the point in question under the short-circuit conditions assumed.

It is to be observed that the particular embodiment of my invention herein illustrated and described is intended for operation on direct current, and also that said embodiment includes only resistances for the several simulating units. In actual practice, in real systems operating on alternating current the various elements to be simulated are such that reactance and capacitance also exist, but it can be shown and is well understood that the actual resistances and capacitances of the real elements of the real system may frequently be ignored in representing the real system in miniature, and also that the reactances of the real elements may be simulated or represented in miniature by resistances in the miniature system, and with a small percentage of error. Therefore I have chosen to herein illustrate and describe only a miniature system embodying the features of my present invention by use of resistances to simulate in miniature the reactance elements of the real system; and thereby I am also able to operate my miniature system by use of direct current, and secure test results which are accurate within a percent of error comparable to the probable errors of the basic data applying to the real system being simulated. Thereby, also, I am able to provide a much simpler, cheaper, and smaller miniature system than it would otherwise be possible to use, the necessary operations to set up and carry out a series of tests are greatly reduced in number and simplified, and the possibility of errors due to various causes is greatly reduced.

Now it will be seen that I provide a simulating unit corresponding to each real element of the network or system to be simulated; that each such simulating unit includes continuously variable means so that such continuously variable means may be varied continuously with an infinite possible number of adjustments throughout the range of such continuously variable means; that such continuously variable means simulates an electrical property of the simulated element of the real network, whether such electrical property so simulated be resistance, reactance, capacitance, or what not or a combination of such qualities; that I have provided meter means whereby the quantum of the electrical quality of the simulating unit may be observed as said unit is thus continuously varied, so as to be able to bring said unit to correct adjustment to correctly simulate the electrical property or properties of the real element of the real network; or that I have provided means whereby any selected unit of the miniature system may be connected to such meter means for the foregoing and other purposes; that thereby the same meter means may be used for comparison with any one of the many simulating units of my entire device, thus reducing all such comparisons to a common basis of comparison, making it unnecessary to take account of actual or real voltage factors (as long as the voltage remains substantially unchanged during a set of tests); and that thereby I may also make use of such meter means for tests of various conditions and factors existing in the network or various portions or locations thereof, after the various simulating units have been pre-set to proper values and interconnected in proper manners.

Where in the claims to follow I use the expression "simulating value" or equivalent expressions in reference to the elements of my miniature network I contemplate that value of resistance or reactance to which the element may be brought and which accurately represents in the miniature network the corresponding quantity of the corresponding element of the real network, irrespective of the voltage and/or frequency of the then existing applied potential. While this simulating value, or simulated value, can be measured in ohms, such ohmic measure is a function, not only of the corresponding quantity of the corresponding element of the real network, but also of the applied electromotive force; and the same simulating value may have various ohmic values under various conditions of operation.

It will also be noted that insofar as concerns the foregoing and other characteristics of my present device, the same may be of nature or construction to operate on either direct or alternating current, and may be used for simulation of either direct or alternating current real networks or systems; and that such simulation of alternating current networks or systems may be effected by devices embodying features of my present invention, and with employment of either direct or alternating current in the operation of such devices embodying features of my present invention, and with only such degrees or amounts of errors as hereinbefore explained.

It is therefore evident that, within the scope of my present invention it would be equally possible to provide each simulating unit with a continuously variable reactance element, or a continuously variable resistance element (as illustrated specifically herein), or a continuously variable capacitance element, or a combination of any two or more such elements, as desired, together with suitable connections thereof and therefor, and in conjunction with suitable meter means or other indicating means, usable with any selected one or more of such units, according to the disclosures hereinbefore set out. I therefore do not intend to limit the features of my present invention as respects these and other elements thereof, except as I may do so in the claims to follow.

It was previously mentioned that one feature of the present invention relates to the provision of a table which shall be completely self-contained and/or portable. Reference may be had especially to Figure 1 which shows a very convenient practical construction which I have found useful in actual practice of my invention. In this case the panel board 36, on which the various electrical elements are mounted, is provided as the front panel of a box-like structure, including the top, bottom, ends, and back wall, as will be readily apparent from examination of Figure 1. This box-like structure may be of such size as to make provision for the cells or compartments 115 and 116; the compartment 115 being, if desired, left open at the front, and being suitable for accommodation of the various U-shaped or staple connectors, the various cords and plugs, and other accessories, if any, needed or convenient for carrying forward the various operations in the use of the table. Then the compartment 116 may be used for accommodation of the dry cells or other source of current and potential.

In the arrangement shown in Figure 1 I have also made provision for eight simulating units carried by the panel board 36 of the main instrument section. Frequently it will be necessary to make provision for many other such simulating units, for example a total of forty. In such case it is convenient to mount such other simulating units on a companion panel board 117, carried by a companion box-like structure 118 alongside or endwise of the panel board section 36, and hinged thereto, as well shown by the fragmentary portion at the left-hand side of Figure 1. With such an arrangement the two sections may be readily folded together, face to face, and locked in such condition, for ready carrying from one location to another. Manifestly, if still greater capacity in number of simulating units should be desired, it may be readily provided either by larger panel boards, carrying greater numbers of the units, or by additional panel boards carrying the additional simulating units, and either connected to the panel boards 36 and 117 or otherwise, as desired, but nevertheless usable in connection therewith by means of the proper cords or jumpers or staples or the like.

While I have herein shown and described in detail only one embodiment of the features of my present invention, still it will be understood that I do not intend to limit myself thereto, except as I may do so in the claims to follow.

I claim:

1. In a device of the class described, the combination of continuously adjustable impedance elements, means for the interconnection thereof to form a miniature network to simulate a real network, current responsive indicating means, a potential source, and switching means including a multi-conductor jack associated with each said impedance element and a single co-operating plug for the connection of any selected such impedance element in circuit with said indicating means and said potential source, a scale on said indicating means reciprocally related to the magnitude of current flowing therein, and means for the adjustment of said selected impedance elements to a selected setting as indicated on said scale.

2. In a device of the class described, the combination of continuously adjustable impedance elements, means for the interconnection thereof to form a miniature network to simulate a real network, current responsive indicating means, a potential source, and switching means for the connection of any selected impedance element in circuit with said current responsive indicating means and said potential source, and means for the adjustment of said impedance element to a selected setting as indicated by said indicating means.

3. In a device of the class described, the combination of continuously adjustable impedance elements, means for the interconnection thereof to form a miniature network to simulate a real network, current responsive indicating means, a potential source, and means for the adjustment of any selected impedance element to a selected setting as indicated by said current responsive indicating means, in circuit with said potential source.

4. In a device of the class described, the combination of continuously adjustable impedance elements, means for the interconnection thereof to form a miniature network to simulate a real network, current responsive indicating means, switching means to connect said current responsive indicating means in circuit with any selected adjustable impedance element, and a scale on said current responsive indicating means to indicate on said scale the setting of said selected adjustable impedance element.

JAMES H. STARR.